US012639207B2

(12) United States Patent
Cheng

(10) Patent No.: US 12,639,207 B2
(45) Date of Patent: May 26, 2026

(54) MANAGEMENT OF STORAGE REGIONS OF AN ELECTRONIC APPARATUS

(71) Applicant: YANGTZE MEMORY TECHNOLOGIES CO., LTD., Wuhan (CN)

(72) Inventor: Mo Cheng, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/594,809

(22) Filed: Mar. 4, 2024

(65) Prior Publication Data

US 2025/0165388 A1     May 22, 2025

(30) Foreign Application Priority Data

Nov. 22, 2023     (CN) .......................... 202311573952.8

(51) Int. Cl.
*G06F 12/02*          (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS

| | | | |
|---|---|---|---|
| 2003/0046505 A1* | 3/2003 | Craddock ............... | G06F 12/12 711/E12.067 |
| 2003/0135789 A1* | 7/2003 | DeWitt, Jr. ......... | G06F 11/3636 714/E11.212 |
| 2006/0236063 A1* | 10/2006 | Hausauer ............ | G06F 12/1081 711/170 |
| 2010/0274868 A1* | 10/2010 | Arroyo .................... | G06F 9/52 709/212 |
| 2017/0090780 A1* | 3/2017 | Anantaraman ..... | G06F 12/0804 |
| 2019/0107965 A1* | 4/2019 | Deval ................... | G06F 3/0659 |
| 2021/0073129 A1* | 3/2021 | Shah ................... | G06F 9/30047 |
| 2022/0050615 A1* | 2/2022 | Teranishi ............... | G06F 3/061 |
| 2022/0188246 A1* | 6/2022 | Gyllenskog ......... | G06F 13/1668 |
| 2022/0269797 A1* | 8/2022 | Saby .................... | G06F 21/602 |
| 2022/0327048 A1* | 10/2022 | Pourhabibi Zarandi .................... G06F 9/3004 |
| 2024/0311300 A1* | 9/2024 | Zhang ................. | G06F 12/0804 |

* cited by examiner

*Primary Examiner* — Tasnima Matin
(74) *Attorney, Agent, or Firm* — Conley Rose, P.C.

(57) ABSTRACT

Examples of the present disclosure provide a host system, a memory system, an electronic apparatus, an operation method, and a storage medium. The host system comprises: a host controller, wherein the host controller is coupled to a memory system, the memory system comprises a memory device, the memory device comprises a plurality of regions, and the plurality of regions comprises a first region. The host controller is configured to send a first instruction, wherein the first instruction indicates to set the first region to a pinned region and obtain mapping information corresponding to the first region, and the first region is determined according to an application corresponding to a respective region.

20 Claims, 14 Drawing Sheets

A HOST SYSTEM OF AN ELECTRONIC APPARATUS SENDS A FIRST INSTRUCTION ⌐ S1201

A MEMORY SYSTEM OF THE ELECTRONIC APPARATUS RECEIVES THE FIRST INSTRUCTION; AND IN RESPONSE TO THE FIRST INSTRUCTION, SETS A FIRST REGION OF A MEMORY DEVICE IN THE MEMORY SYSTEM TO A PINNED REGION, AND DETERMINES MAPPING INFORMATION CORRESPONDING TO THE FIRST REGION, WHEREIN THE FIRST REGION IS DETERMINED ACCORDING TO AN APPLICATION CORRESPONDING TO A RESPECTIVE REGION ⌐ S1202

<u>801</u> First read operation
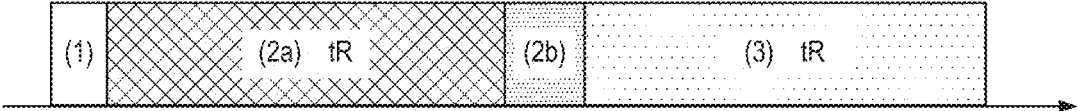
<u>802</u> Second read operation
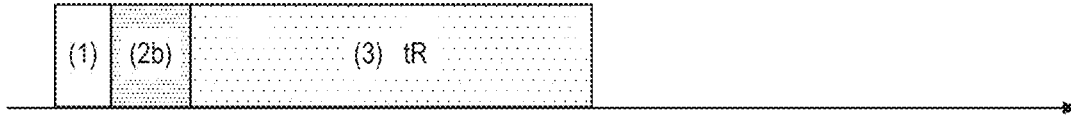
<u>803</u> Third read operation
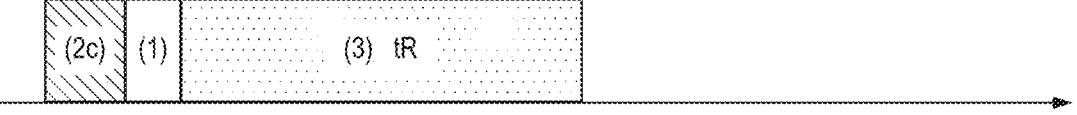
FIG. 8

| APPLICATION | RESPECTIVE REGION |
|---|---|
| APP1 | REGION X-Y |
| APP2 | REGION A-B |
| APP3 BEFORE UPDATE | REGION C-D |
| APP3 AFTER UPDATE | REGION E-F |

A HOST CONTROLLER PINS A RESPECTIVE REGION OF APP1

HOST SYSTEM → MEMORY DEVICE

PIN THE REGIONS X-Y

A HOST CONTROLLER PINS A RESPECTIVE REGION OF APP3

HOST SYSTEM → MEMORY DEVICE

UNPIN THE REGIONS C-D

PIN THE REGIONS E-F

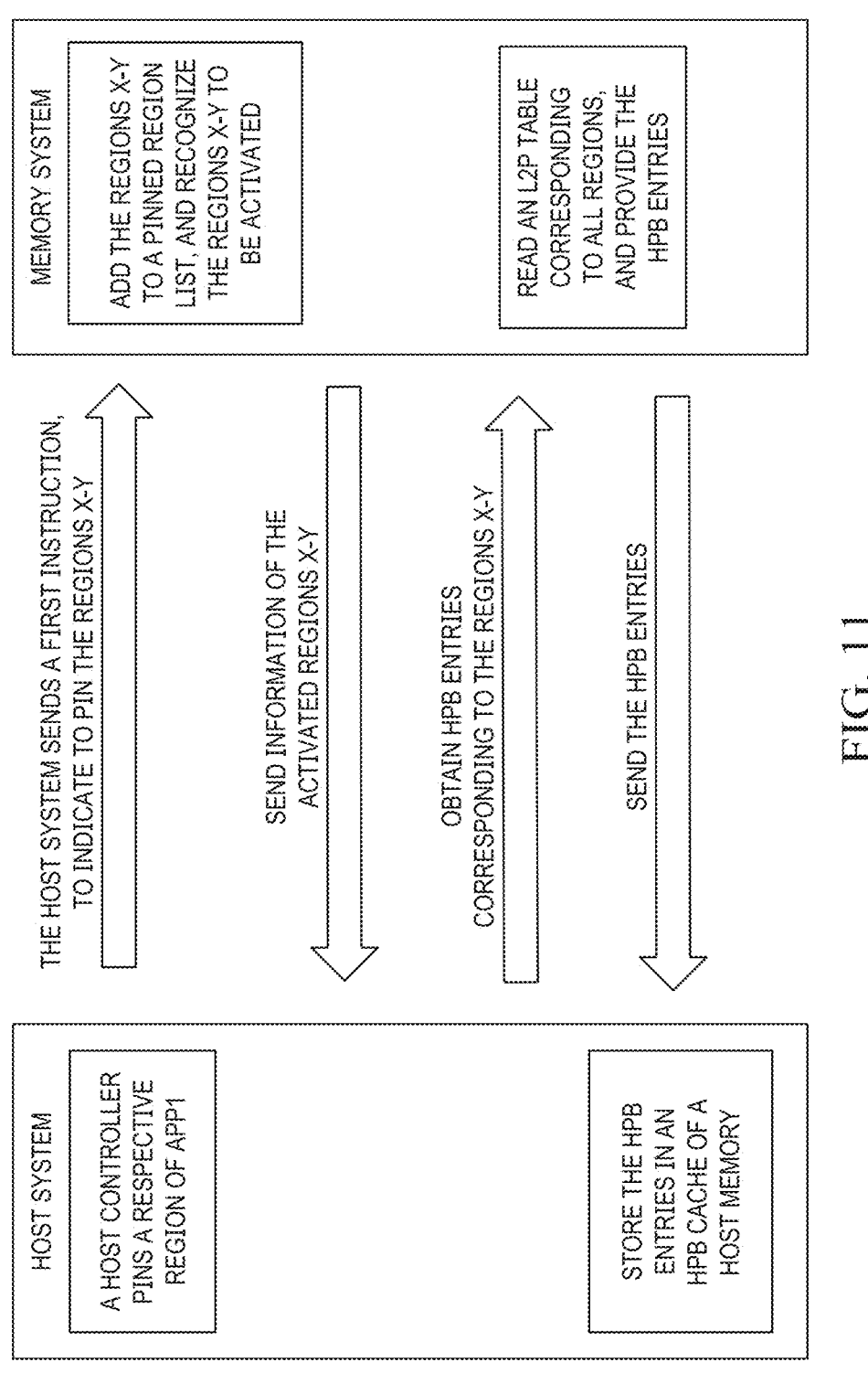

MEMORY SYSTEM

ADD THE REGIONS X-Y TO A PINNED REGION LIST, AND RECOGNIZE THE REGIONS X-Y TO BE ACTIVATED

READ AN L2P TABLE CORRESPONDING TO ALL REGIONS, AND PROVIDE THE HPB ENTRIES

THE HOST SYSTEM SENDS A FIRST INSTRUCTION, TO INDICATE TO PIN THE REGIONS X-Y

SEND INFORMATION OF THE ACTIVATED REGIONS X-Y

OBTAIN HPB ENTRIES CORRESPONDING TO THE REGIONS X-Y

SEND THE HPB ENTRIES

HOST SYSTEM

A HOST CONTROLLER PINS A RESPECTIVE REGION OF APP1

STORE THE HPB ENTRIES IN AN HPB CACHE OF A HOST MEMORY

FIG. 11

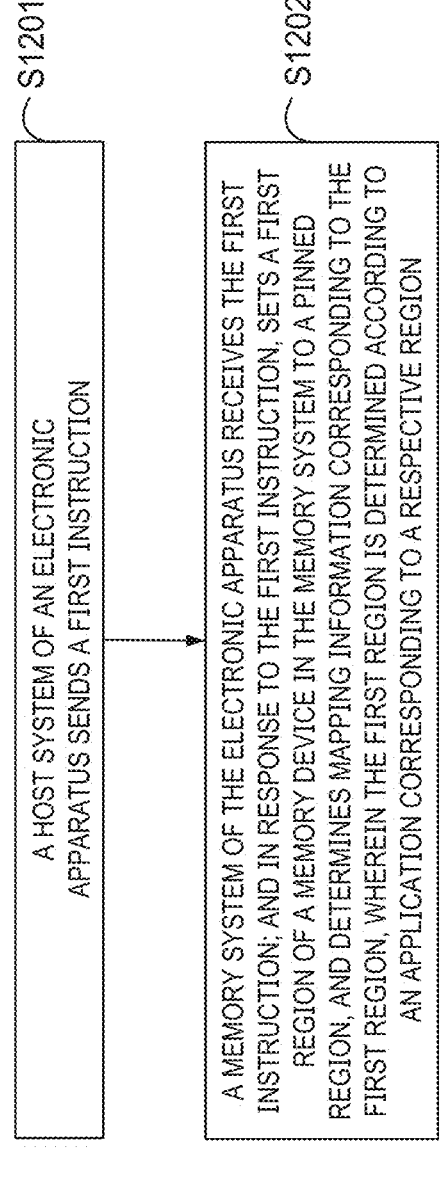

A HOST SYSTEM OF AN ELECTRONIC APPARATUS SENDS A FIRST INSTRUCTION

— S1201

A MEMORY SYSTEM OF THE ELECTRONIC APPARATUS RECEIVES THE FIRST INSTRUCTION; AND IN RESPONSE TO THE FIRST INSTRUCTION, SETS A FIRST REGION OF A MEMORY DEVICE IN THE MEMORY SYSTEM TO A PINNED REGION, AND DETERMINES MAPPING INFORMATION CORRESPONDING TO THE FIRST REGION, WHEREIN THE FIRST REGION IS DETERMINED ACCORDING TO AN APPLICATION CORRESPONDING TO A RESPECTIVE REGION

MANAGEMENT OF STORAGE REGIONS OF AN ELECTRONIC APPARATUS

CROSS-REFERENCE TO RELATED APPLICATIONS

The present application claims priority to Chinese Patent Application No. 2023115739528, which was filed Nov. 22, 2023, is titled "HOST SYSTEM, MEMORY SYSTEM, ELECTRONIC EQUIPMENT AND OPERATING METHOD, STORAGE MEDIUM," and is hereby incorporated herein by reference in its entirety.

TECHNICAL FIELD

Examples of the present disclosure relate to the field of semiconductor technologies, and in examples, to a host system, a memory system, an electronic apparatus, an operation method, and a storage medium.

BACKGROUND

A memory device is a storage apparatus configured to save information in a modern information technique. As a typical nonvolatile semiconductor memory, a Not-And (NAND) memory gradually becomes a mainstream product in the storage market due to a relatively high storage density, controllable production costs, appropriate write and erase speeds, and a retention characteristic.

SUMMARY

Based on this, examples of the present disclosure provide a host system, a memory system, an electronic apparatus and an operation method, and a storage medium. A host system provided by examples of the present disclosure comprises: a host controller, wherein the host controller is coupled with a memory system, the memory system comprises a memory device, the memory device comprises a plurality of regions, and the plurality of regions comprise a first region; and the host controller is configured to send a first instruction, wherein the first instruction indicates to set the first region to a pinned region; and obtain mapping information corresponding to the first region, and the first region is determined according to an application corresponding to a respective region.

In an implementation, the host controller is configured to send a second instruction, wherein the second instruction comprises the mapping information, and the second instruction indicates to read data of the first region according to the mapping information.

In an implementation, the host controller is configured to determine the first region from the plurality of regions according to attribute information of the application.

In an implementation, the host controller is configured to: before sending the first instruction, determine that the first region is a non-pinned region.

In an implementation, the plurality of regions further comprise a second region, and the first region and the second region correspond to a same application; the first region is configured to store data of the same application before update; and the second region is configured to store data of the same application after update; and the host controller is configured to: after sending the first instruction, if data of the same application has been updated, send a third instruction, wherein the third instruction indicates to set the first region to a non-pinned region and set the second region to a pinned region.

In an implementation, the host controller is configured to: before sending the first instruction, send a fourth instruction, wherein the fourth instruction indicates to write data to the memory device.

In an implementation, the host system further comprises: a host memory, wherein the host memory is configured to store the mapping information.

Examples of the present disclosure further provide a memory system, coupled with a host system, and comprising: a memory device, comprising a plurality of regions, wherein the plurality of regions comprise a first region; and a memory controller, coupled with the memory device, and configured to: receive a first instruction; and in response to the first instruction, set the first region to a pinned region, and determine mapping information corresponding to the first region, wherein the first region is determined according to an application corresponding to a respective region.

In an implementation, the memory controller is configured to: receive a second instruction, wherein the second instruction comprises the mapping information; and in response to the second instruction, read data of the first region according to the mapping information.

In an implementation, the plurality of regions further comprise a second region, and the first region and the second region correspond to a same application; the first region is configured to store data of the same application before update; and the second region is configured to store data of the same application after update; and the memory controller is configured to: after receiving the first instruction, if data of the same application has been updated, receive a third instruction; and in response to the third instruction, set the first region to a non-pinned region, and set the second region to a pinned region.

In an implementation, the memory controller is configured to: before receiving the first instruction, receive a fourth instruction; and in response to the fourth instruction, write data to the memory device.

Examples of the present disclosure further provide an electronic apparatus, comprising: a host system and a memory system coupled with the host system, wherein the memory system comprises a memory device and a memory controller coupled with the memory device; the memory device comprises a plurality of regions; and the plurality of regions comprise a first region; the host system is configured to send a first instruction; and the memory controller is configured to: receive the first instruction; and in response to the first instruction, set the first region to a pinned region, and determine mapping information corresponding to the first region, wherein the first region is determined according to an application corresponding to a respective region.

In an implementation, the host system is configured to send a second instruction, wherein the second instruction comprises the mapping information; and the memory controller is configured to: receive the second instruction; and in response to the second instruction, read data of the first region according to the mapping information.

In an implementation, the host system is configured to: after sending the first instruction, if data of an application corresponding to the first region has been updated, send a third instruction; and the memory controller is configured to: after receiving the first instruction, if the data of the application corresponding to the first region has been updated, receive the third instruction; and in response to the third instruction, set the first region to a non-pinned region, and set a second region to a pinned region, wherein the plurality of regions further comprise the second region, and the first region and the second region correspond to a same application; the first region is configured to store data of the same application before update; and the second region is configured to store data of the same application after update.

In an implementation, the host system is configured to: before sending the first instruction, send a fourth instruction; and the memory controller is configured to: before receiving the first instruction, receive the fourth instruction; and in response to the fourth instruction, write data to the memory device.

Examples of the present disclosure further provide an operation method of an electronic apparatus. A host system of the electronic apparatus sends a first instruction; and a memory system of the electronic apparatus receives the first instruction; and in response to the first instruction, sets a first region of a memory device in the memory system to a pinned region, and determines mapping information corresponding to the first region, wherein the first region is determined according to an application corresponding to a respective region, wherein the host system is coupled with the memory system; the memory system comprises the memory device and a memory controller coupled with the memory device; the memory device comprises a plurality of regions; and the plurality of regions comprise the first region.

In an implementation, the host system sends a second instruction, wherein the second instruction comprises the mapping information; and the memory controller receives the second instruction; and in response to the second instruction, reads data of the first region according to the mapping information.

In an implementation, the operation method further comprises: after the first instruction is sent, if data of an application corresponding to the first region has been updated, sending, by the host system, a third instruction; and receiving, by the memory controller, the third instruction; and in response to the third instruction, setting the first region to a non-pinned region, and setting a second region to a pinned region, wherein the plurality of regions further comprise the second region, and the first region and the second region correspond to a same application; the first region is configured to store data of the same application before update; and the second region is configured to store data of the same application after update.

In an implementation, the method further comprises: before the host system sends the first instruction, sending a fourth instruction; and before the memory controller receives the first instruction, receiving the fourth instruction; and in response to the fourth instruction, writing data to the memory device.

Examples of the present disclosure further provide a storage medium, wherein the storage medium stores executable instructions which, when being executed by an electronic apparatus, can achieve operations of the method in the above examples of the present disclosure.

BRIEF DESCRIPTION OF THE DRAWINGS

FIG. 8 is a schematic diagram of implementation procedures corresponding to different read operations provided by an example of the present disclosure;

FIG. 11 is a schematic flowchart of reading data of a first application provided by an example of the present disclosure;

FIG. 12 is a schematic flowchart of an operation method of an electronic apparatus provided by an example of the present disclosure.

Figure 1:
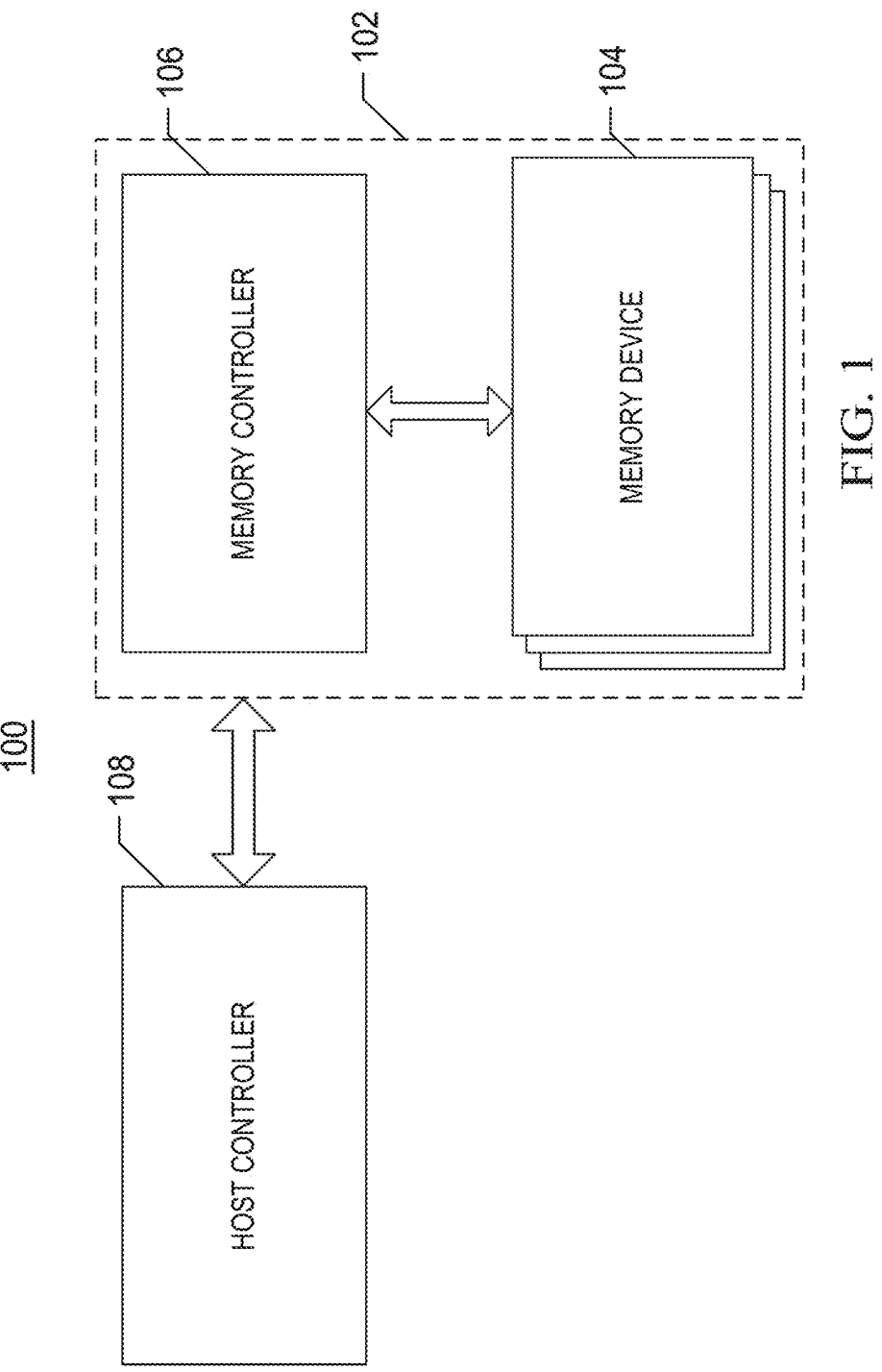
FIG. 1 is a schematic diagram of an example system having a memory system according to an example of the present disclosure.

In the above drawings (not necessarily drawn to scale), like reference numerals may describe like components in different views. Like reference numerals having different letter suffixes may represent different examples of like components. The accompanying drawings illustrate generally, by way of example, but not by way of limitation, various examples as discussed herein.

DETAILED DESCRIPTION

Example implementations disclosed by the present disclosure will be described below in more details with reference to the accompanying drawings. Although example implementations of the present disclosure are shown in the figures, the present disclosure may be implemented by any form without being limited by the example implementations as set forth herein. Rather, these implementations are provided for a more thorough understanding of the present disclosure, and can fully convey the scope disclosed by the present disclosure to those skilled in the art.

In the following description, numerous example details are presented to provide a more thorough understanding of the present disclosure. However, it is apparent to those skilled in the art that the present disclosure may be practiced without one or more of these details. In other examples, in order to avoid confusing with the present disclosure, some technical features well-known in the art are not described;

that is, not all features of actual examples are described herein, and well-known functions and structures are not described in detail.

In the drawings, sizes and relative sizes of layers, areas and elements may be exaggerated for clarity. Like reference numerals denote like elements throughout.

When an element or a layer is referred to as being "on", "adjacent to", "connected to", or "coupled to" other elements or layers, it may be directly on, adjacent to, connected to, or coupled to the other elements or layers, or intervening elements or layers may be present. In contrast, when an element is referred to as being "directly on", "directly adjacent to", "directly connected to", or "directly coupled to" other elements or layers, no intervening elements or layers are present. Although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present disclosure. When the second element, component, area, layer or portion is discussed, it does not mean that the first element, component, area, layer or portion is necessarily present in the present disclosure.

The spatially relative terms, such as "beneath", "below", "lower", "under", "over", "upper", and the like, may be used herein for ease of description to describe one element or feature's relationship to other elements or features as illustrated in the figures. The spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatial descriptors used herein are interpreted accordingly.

The terms used herein are only intended to describe the examples, and are not used as limitations of the present disclosure. As used herein, unless otherwise indicated expressly in the context, "a", "an" and "the" in a singular form are also intended to comprise a plural form. It should also be understood that the terms "consist of" and/or "comprise", when used in this specification, determine the presence of the feature, integer, step, operation, element and/or component, but do not preclude the presence or addition of one or more of other features, integers, steps, operations, elements, components, and/or groups. As used herein, the term "and/or" comprises any or all combinations of the listed relevant items.

In order to be capable of understanding the characteristics and the technical contents of the examples of the present disclosure in more detail, implementation of the examples of the present disclosure is set forth in detail below in conjunction with the drawings, and the appended drawings are only used for reference and illustration, instead of being used to limit the examples of the present disclosure.

The memory device in the examples of the present disclosure comprises, but is not limited to, a three-dimensional NAND memory. For ease of understanding, the illustration is made by taking the three-dimensional NAND memory as an example.

FIG. 1 illustrates a block diagram of an example system 100 having a memory device according to some aspects of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having storages therein. As shown in FIG. 1, the system 100 may comprise a host system 108 and a memory system 102. The memory system 102 has one or more memory devices 104 and a memory controller 106. The host system 108 may be a processor (e.g., a central processing unit (CPU)) or a system on chip (SOC) (e.g., an application processor (AP)) of an electronic apparatus. The host system 108 may be configured to send or receive data to or from memory devices 104.

According to some implementations, the memory controller 106 is coupled to the memory devices 104 and the host system 108, and configured to control the memory devices 104. The memory controller 106 can manage the data stored in the memory devices 104 and communicate with the host system 108. In some implementations, the memory controller 106 is designed for operating in a low duty-cycle environment such as Secure Digital (SD) cards, Compact Flash (CF) cards, Universal Serial Bus (USB) flash drives, or other media for use in electronic apparatuses, such as personal computers, digital cameras, mobile phones, etc. In some implementations, the memory controller 106 is designed for operating in high duty-cycle environment of Solid-State Drives (SSD) or embedded Multi-Media Cards (eMMCs) used as data storages for mobile apparatuses, such as smartphones, tablets, laptop computers, etc., and enterprise memory arrays.

The memory controller 106 may be configured to control operations of the memory devices 104, such as read, erase, and program operations. The memory controller 106 may be further configured to manage various functions with respect to data stored or to be stored in the memory devices 104, comprising, but not limited to, bad-block management, garbage collection, logical-to-physical address translation, wear leveling, etc. In some implementations, the memory controller 106 is further configured to process error correction codes (ECC) with respect to the data read from or written to the memory devices 104. The memory controller 106 may further perform any other suitable functions as well, for example, formatting the memory devices 104. The memory controller 106 may communicate with an external apparatus (e.g., the host system 108) according to a communication protocol. For example, the memory controller 106 may communicate with the external apparatus through at least one of various interface protocols, such as a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

Figures 2A, 2B:
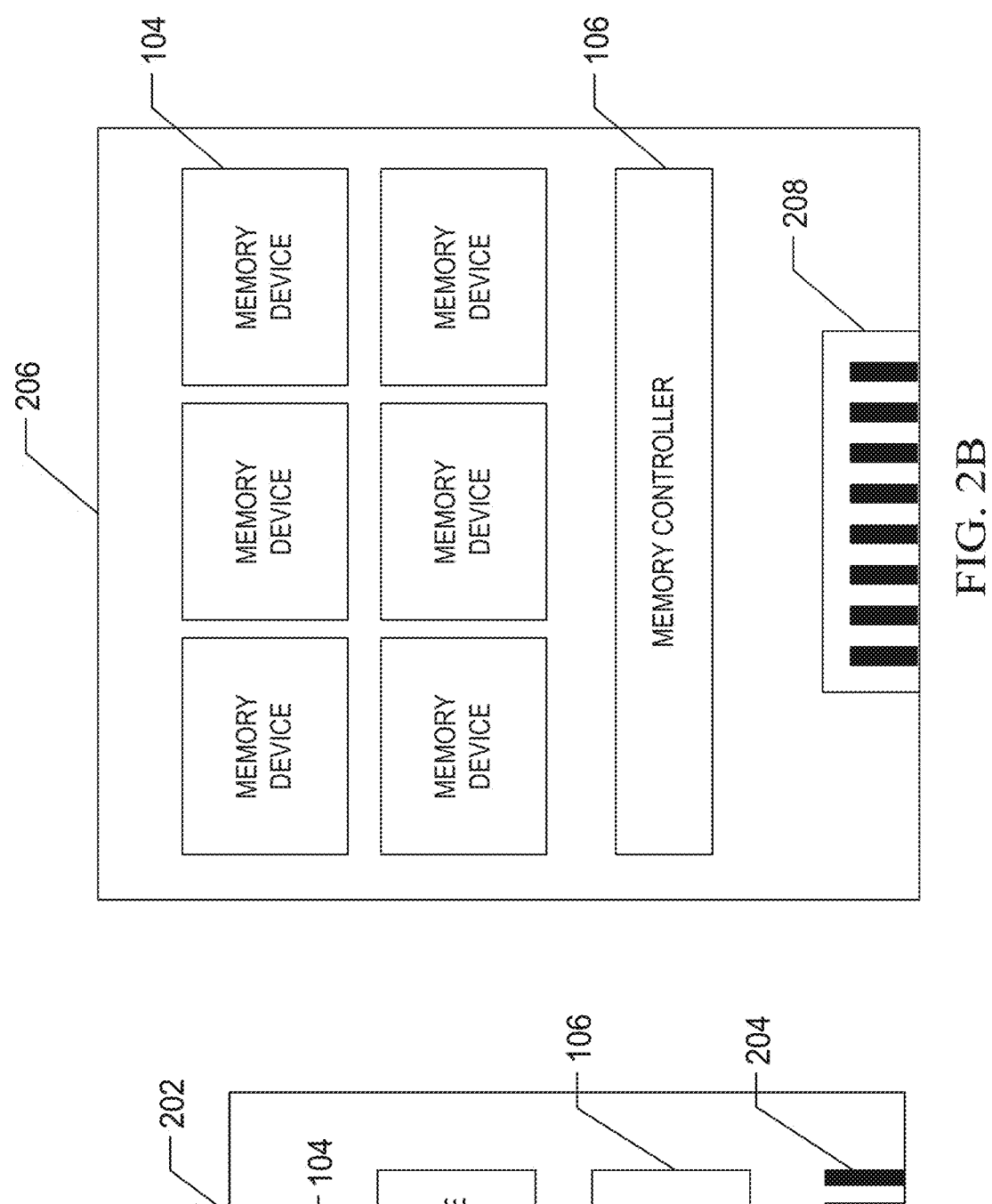
FIG. 2A is a schematic diagram of an example memory card having a memory system according to an example of the present disclosure.
FIG. 2B is a schematic diagram of an example solid-state drive having a memory system according to an example of the present disclosure.

The memory controller 106 and the one or more memory devices 104 can be integrated into various types of storage apparatuses, for example, be comprised in the same package, such as a Universal Flash Storage (UFS) package or an eMMC package. That is to say, the memory system 102 may be implemented and packaged into different types of end electronic products. In one example as shown in FIG. 2A, the memory controller 106 and a single memory device 104 may be integrated into a memory card 202. The memory card 202 may comprise a PC card (PCMCIA, Personal Computer Memory Card International Association), a CF card, a Smart Media (SM) card, a memory stick, a Multimedia card (MMC, RS-MMC, MMCmicro), an SD card (SD, miniSD, microSD, SDHC), a UFS, etc. The memory card 202 may further comprise a memory card connector 204 coupling the memory card 202 with a host (e.g., the host system 108 in FIG. 1). In another example as shown in FIG. 2B, the memory controller 106 and a plurality of memory devices 104 may be integrated into an SSD 206. The SSD 206 may further comprise an SSD connector 208 coupling the SSD 206 with a host (e.g., the host system 108 in FIG. 1). In some implementations, a storage capacity and/or an operation speed of the SSD 206 is greater than a storage capacity and/or an operation speed of the memory card 202.

Figure 3A:
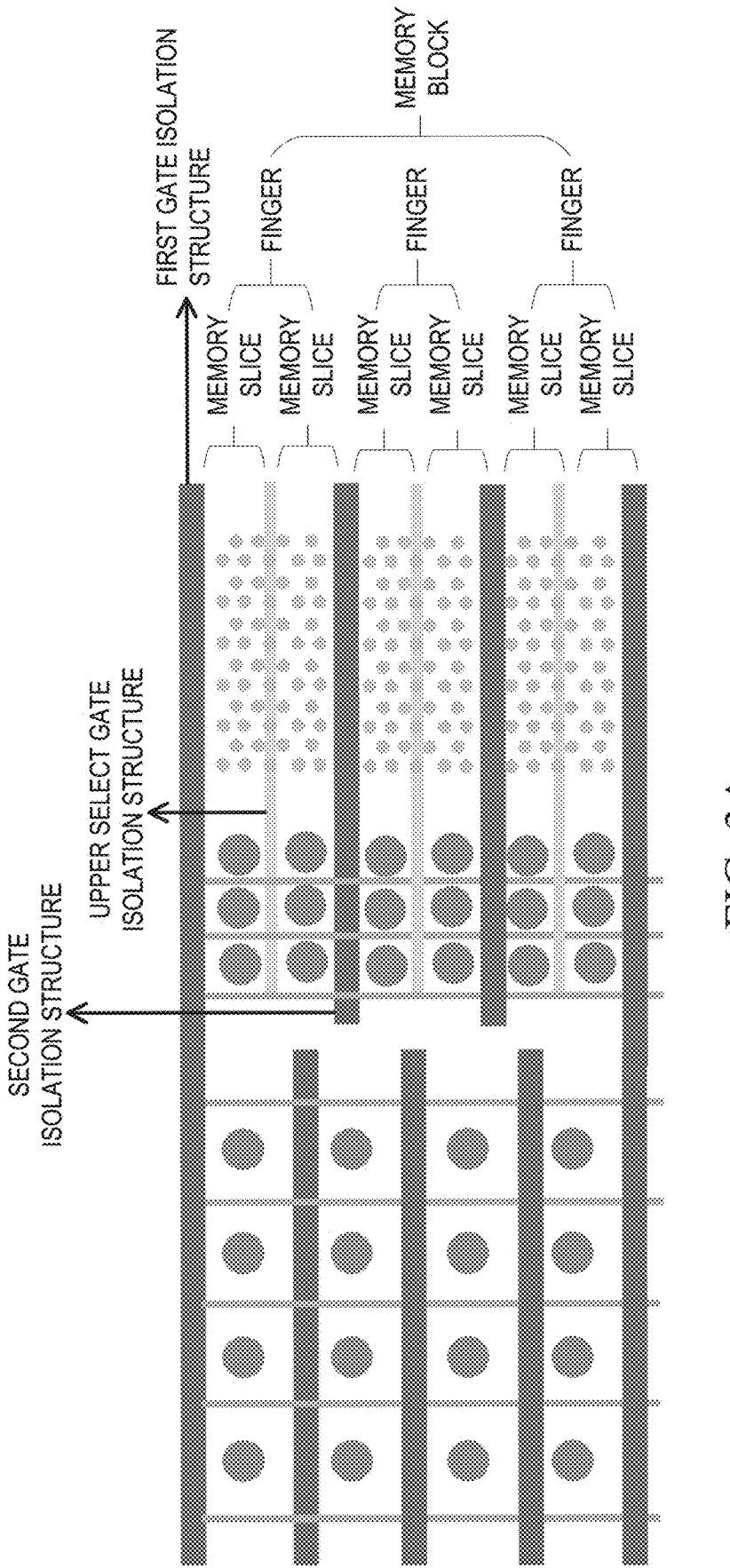
FIG. 3A is a schematic distribution diagram of memory cells of a three-dimensional NAND memory according to an example of the present disclosure.

FIG. 3A gives an example of a schematic structural diagram of a memory cell array of a three-dimensional NAND memory. As shown in FIG. 3A, the memory cell array of the three-dimensional NAND memory is formed by a plurality of memory cell rows that are staggered and in parallel and that are parallel to a gate isolation structure. Every two memory cell rows are spaced apart by the gate isolation structure and an upper select gate isolation structure. Each memory cell row comprises a plurality of memory cells. The gate isolation structure may comprise a first gate isolation structure and a second gate isolation structure. The first gate isolation structure divides the memory cell array into a plurality of memory blocks. A plurality of second gate isolation structures may divide the memory blocks into a plurality of fingers. The upper select gate isolation structure disposed in the middle of each finger may divide the finger into two parts, to divide the finger into two memory slices. One memory block shown in FIG. 3A comprises six memory slices. During actual application, the number of memory slices in one memory block is not limited thereto.

In some examples, each memory block may be coupled to a plurality of word lines. A plurality of memory cells coupled to each separately controlled word line form a page. In an example, all memory cells in each memory slice in FIG. 3A are coupled to form a page.

A row number of memory cell rows between the gate isolation structure and the upper select gate isolation structure in FIG. 3A is only example, but is not used to limit the number of memory cell rows comprised in one finger of the three-dimensional NAND memory in the present disclosure. During actual application, the number of memory cell rows comprised in one finger may be adjusted according to an actual case, and is, for example, 2, 4, 8, 16, etc.

Figure 3B:
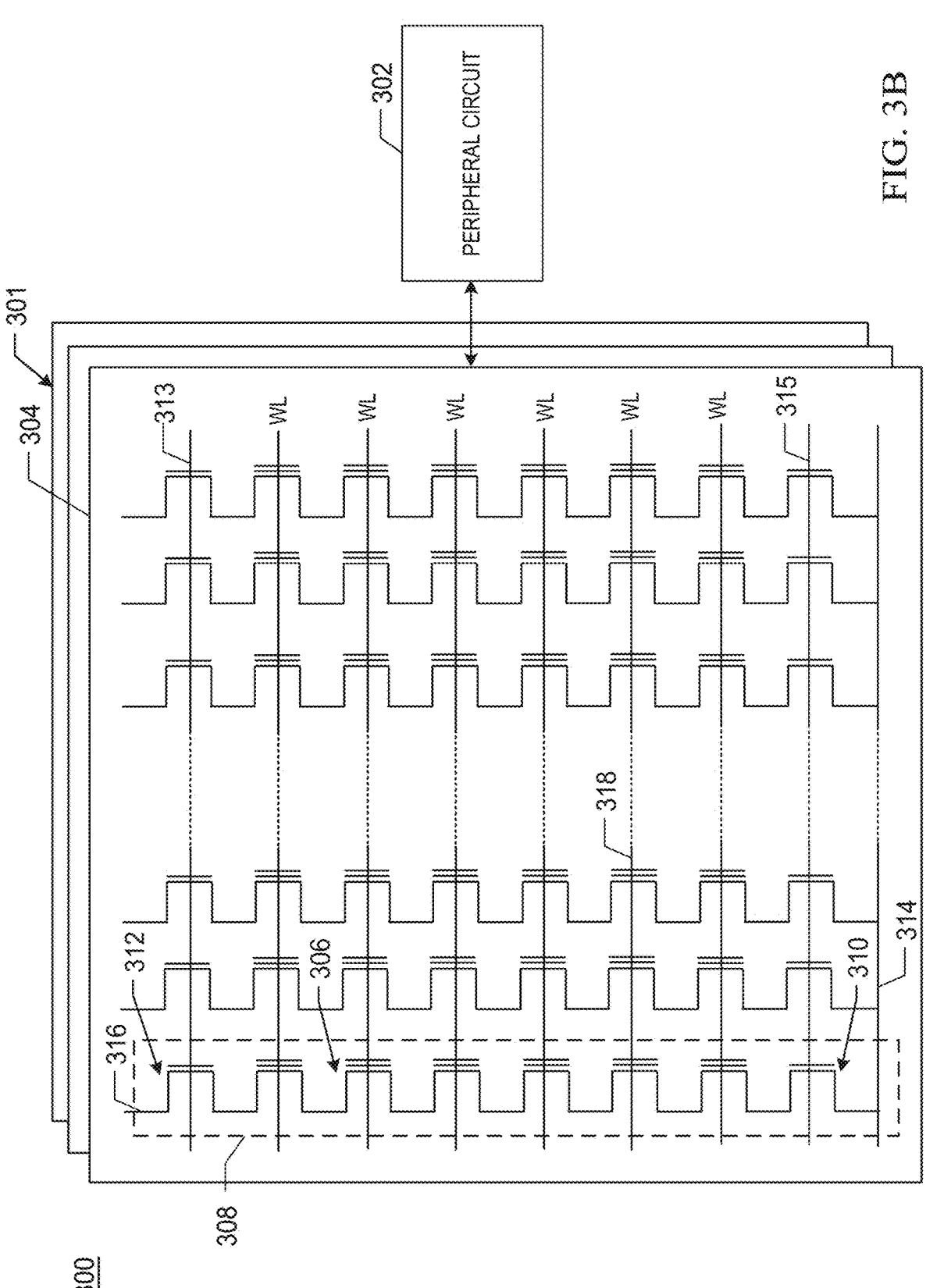
FIG. 3B is a schematic diagram of an example memory comprising a peripheral circuit according to an example of the present disclosure.

FIG. 3B illustrates a schematic circuit diagram of an example memory device 300 comprising a peripheral circuit according to some aspects of the present disclosure. The memory device 300 may be an example of the memory devices 104 in FIG. 1. The memory device 300 may comprise a memory cell array 301 and a peripheral circuit 302 coupled to the memory cell array 301. An illustration is made by taking the memory cell array 301 being a three-dimensional NAND memory cell array as an example, wherein memory cells 306 are NAND memory cells, the memory cells 306 are provided in an array of memory strings 308, and each memory string 308 extends vertically above a substrate (not shown). In some implementations, each memory string 308 comprises a plurality of memory cells 306 that are coupled in series and stacked vertically.

Each memory cell 306 can hold a continuous, analog value, such as an electrical voltage or charge, which depends on a number of electrons trapped within a region of the memory cell 306. Each memory cell 306 may be either a "floating gate" type memory cell that comprises a floating gate transistor, or a "charge trap" type memory cell that comprises a charge trap transistor.

In some implementations, each memory cell 306 is a single-level cell (SLC) having two possible memory states and therefore can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than one bit of data in more than four memory states. For example, the MLC can store two bits per memory cell (which may also be called a double-level cell), three bits per memory cell (also called a trinary-level cell (TLC)), four bits per memory cell (also called a quad-level cell (QLC)), five bits per memory cell (also called a penta-level cell (PLC)), or more than five bits per memory cell. Each MLC can be programmed to assume a range of possible nominal storage values. In an example, if each MLC stores two bits of data, the MLC can be programmed to employ one of three possible programmed levels from an erased state by writing one of three possible nominal storage values to the cell, and a fourth nominal storage value may be used to represent the erased state.

As shown in FIG. 3B, each memory string 308 may comprise a lower select transistor (also referred to as a source side select transistor, and comprising a source select gate BSG 310) at a source terminal of the memory string and an upper select transistor (also referred to as a drain side select transistor, and comprising a drain select gate TSG 312) at a drain terminal of the memory string. The source select gate BSG 310 and the drain select gate TSG 312 may be configured to activate a selected memory string 308 during a read operation and a program operation. In some implementations, sources of memory strings 308 in a same memory block 304 are coupled through a same source line (SL) 314 (for example, a common SL). In other words, according to some implementations, all the memory strings 308 in the same memory block 304 have an array common source (ACS). According to some implementations, the TSG 312 of each memory string 308 is coupled to a respective bit line (BL) 316 which the data can be read from or written to via an output bus (not shown). In some implementations, each NAND memory string 308 is configured to be selected or unselected by applying a select voltage (e.g., above a threshold voltage of a transistor having the TSG 312) or an unselect voltage (e.g., 0 V) to the respective TSG 312 via one or more TSG lines 313 and/or by applying a select voltage (e.g., above a threshold voltage of a transistor having the BSG 310) or an unselect voltage (e.g., 0 V) to the respective BSG 310 via one or more BSG lines 315.

As shown in FIG. 3B, the memory strings 308 can be organized into a plurality of memory blocks 304, each of which may have a common source line 314, e.g., coupled to the ground. In some implementations, each memory block 304 is a basic data unit for the erase operation, i.e., all of the memory cells 306 on the same memory block 304 are erased at the same time. In order to erase the memory cells 306 in a selected memory block 304, the source lines 314 coupled to the selected memory block 304a as well as unselected memory blocks 304 that are in the same plane as the selected memory block 304a can be biased with an erase voltage (Vers), such as a high positive voltage (e.g., 20 V or higher).

In some examples, an erase operation may be performed at a half memory block level, a quarter memory block level, or a level having any suitable number of memory blocks or any suitable fractions of a memory block. The memory cells 306 of adjacent memory strings 308 may be coupled through word lines 318 that select which row of memory cells 306 is affected by read and program operations. In some implementations, with reference to FIG. 3A above, a plurality of memory cells are isolated by the upper select gate isolation structure and the gate isolation structure. A plurality of memory cells between the upper select gate isolation structure and the gate isolation structure are arranged in a plurality of memory cell rows. Each memory cell row is parallel to the gate isolation structure and the upper select gate isolation structure.

With reference to FIGS. 3A and 3B, each of the plurality of memory cells 306 is coupled to the respective word line 318, and each memory string 308 is coupled to the respective bit line 316 through a respective select transistor (such as, the upper select transistor).

Figure 4:
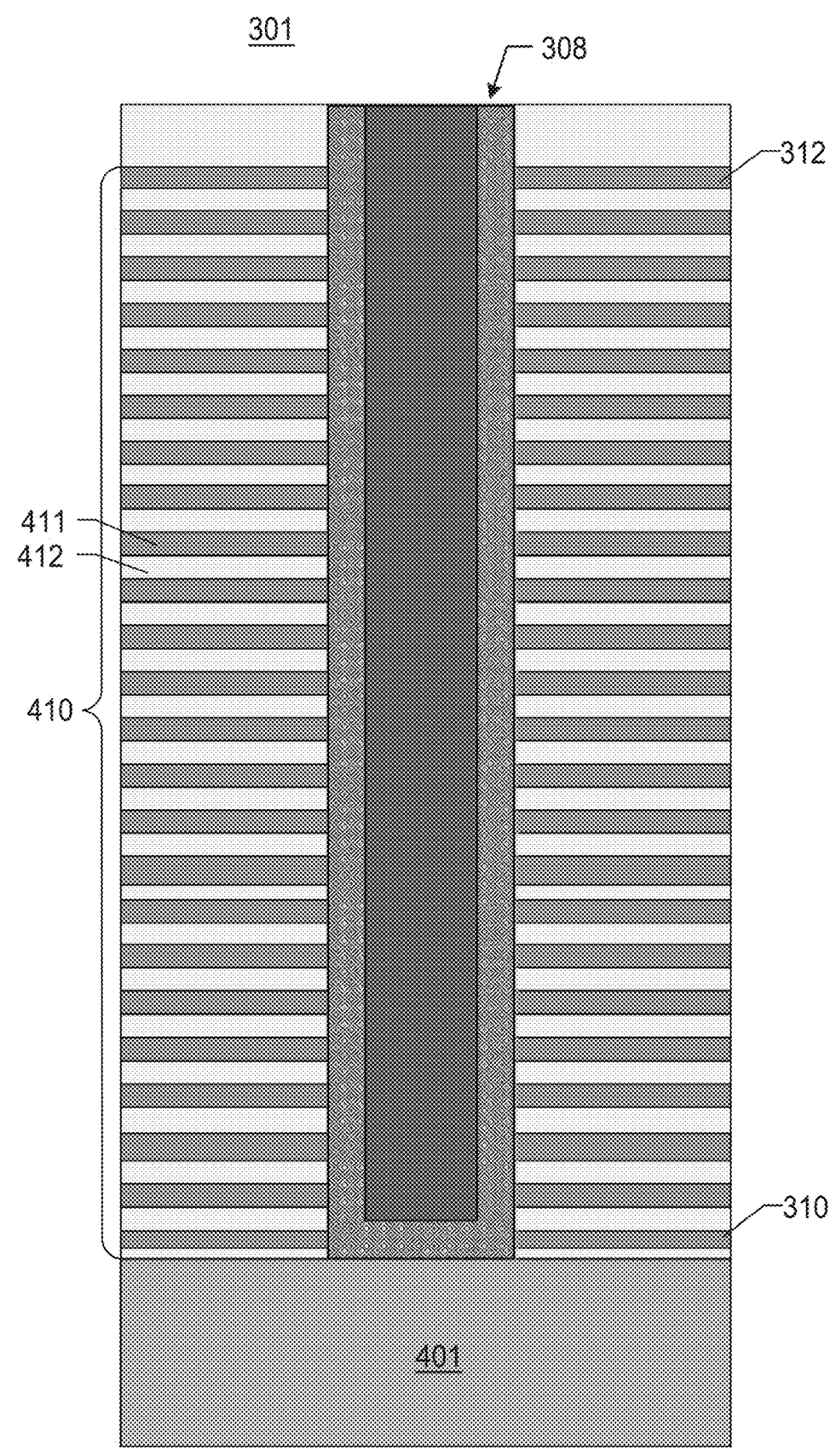
FIG. 4 is a schematic cross-sectional view of a memory cell array comprising a NAND memory string according to an example of the present disclosure.

FIG. 4 illustrates a schematic cross-sectional view of an example memory cell array 301 comprising a memory string 308 with NAND as an example according to some aspects of the present disclosure. As shown in FIG. 4, the NAND memory cell array 301 may comprise a stack structure 410. The stack structure 410 comprises a plurality of gate layers 411 and a plurality of insulating layers 412 that are sequentially and alternately stacked and a channel structure that penetrates the gate layers 411 and the insulating layers 412 vertically. The channel structure is coupled with each gate layer to form a memory cell. The channel structure is coupled with the plurality of gate layers in the stack structure 410 to form the memory string 308. The gate layers 411 and the insulating layers 412 may be alternately stacked, and two adjacent gate layers 411 are spaced apart by one insulating layers 412.

A constituent material of the gate layers 411 may comprise a conductive material. The conductive material comprises, but is not limited to, tungsten (W), cobalt (Co), copper (Cu), aluminum (Al), polysilicon, doped silicon, silicides, or any combination thereof. In some implementations, each gate layer 411 comprises a metal layer, e.g., a tungsten layer. In some implementations, each gate layer 411 comprises a doped polysilicon layer. Each gate layer 411 may comprise a control gate around the memory cells. The gate layer 411 at the top of the stack structure 410 may extend laterally as an upper select gate line; the gate layer 411 at the bottom of the stack structure 410 may extend laterally as a lower select gate line; and the gate layers 411 that extend laterally between the upper select gate line and the lower select gate line may act as word line layers.

In some examples, the stack structure 410 may be disposed on a substrate 401. The substrate 401 may comprise silicon (e.g., single crystalline silicon), silicon germanium (SiGe), gallium arsenide (GaAs), germanium (Ge), silicon on insulator (SOI), germanium on insulator (GOI), or any other suitable materials.

In some examples, the memory string 308 comprises a channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer comprising a tunneling layer, a storage layer (also known as a "charge trap/storage layer"), and a blocking layer. The channel structure may have a cylindrical shape (e.g., a pillar shape). According to some implementations, the semiconductor channel, the tunneling layer, the storage layer, and the blocking layer are arranged radially from the center toward the outer surface of the pillar in this order. The tunneling layer can comprise silicon oxide, silicon oxynitride, or any combination thereof. The storage layer can comprise silicon nitride, silicon oxynitride, or any combination thereof. The blocking layer can comprise silicon oxide, silicon oxynitride, a high dielectric constant (high-k) dielectric, or any combination thereof. In an example, the memory film can comprise a composite layer of silicon oxide/silicon oxynitride/silicon oxide (ONO).

Figure 5:
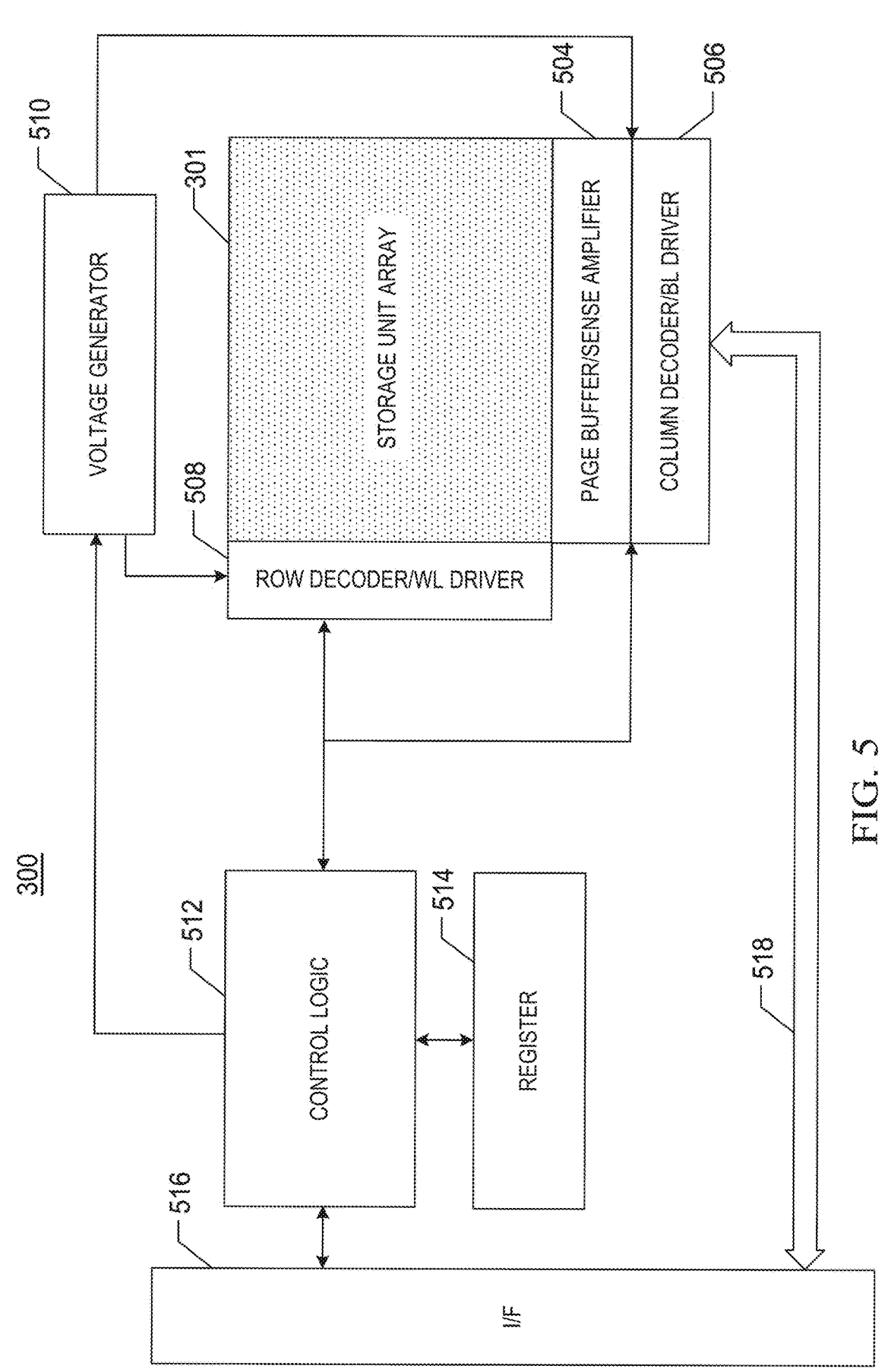
FIG. 5 is a schematic diagram of an example memory device comprising a memory cell array and a peripheral circuit according to an example of the present disclosure.

Referring back to FIG. 3B, the peripheral circuit 302 may be coupled to the memory cell array 301 through the bit lines 316, the word lines 318, the source lines 314, the BSG lines 315 and the TSG lines 313. The peripheral circuit 302 may comprise any suitable analog, digital, and hybrid signal circuits for facilitating the operations of the memory cell array 301 by applying and sensing voltage signals and/or current signals to and from each target memory cell 306 via the bit lines 316, the word lines 318, the source lines 314, the BSG lines 315, and the TSG lines 313. The peripheral circuit 302 may comprise various types of peripheral circuits formed using a metal-oxide-semiconductor (MOS) technology. For example, FIG. 5 illustrates some example peripheral circuits. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. In some examples, additional peripheral circuits not shown in FIG. 5 may be comprised as well.

The page buffer/sense amplifier 504 may be configured to read and program (write) data from and to the memory cell array 301 according to control signals from the control logic 512. In one example, the page buffer/sense amplifier 504 may store program data (write data) to be programmed into the memory cell array 301. In another example, the page buffer/sense amplifier 504 may perform programming verify operations to ensure that the data has been properly programmed into the memory cells 306 that are coupled to the selected word lines 318. In yet another example, the page buffer/sense amplifier 504 may also sense low power signals from the bit lines 316 that represent data bits stored in the memory cells 306, and amplify small voltage swings to recognizable logic levels in read operations. The column decoder/bit line driver 506 may be configured to be controlled by the control logic 512 and select one or more memory strings 308 by applying bit line voltages generated from the voltage generator 510.

The row decoder/word line driver 508 may be configured to be controlled by the control logic 512 and select/unselect the memory blocks 304 of the memory cell array 301 and select/unselect the word lines 318 of the memory blocks 304. The row decoder/word line driver 508 may be further configured to drive the word lines 318 using word line voltages generated from the voltage generator 510. In some implementations, the row decoder/word line driver 508 may also select/unselect and drive the BSG lines 315 and the TSG lines 313. As described in detail below, the row decoder/word line driver 508 is configured to perform a program operation on the memory cell 306 that is coupled to the (one or more) selected word line(s) 318. The voltage generator 510 may be configured to be controlled by the control logic 512 and generate a word line voltage (such as, a read voltage, a program voltage, a pass voltage, a channel boost voltage, a verify voltage, etc.), a bit line voltage and a source line voltage to be supplied to the memory cell array 301.

The control logic 512 can be coupled to every other part in the peripheral circuit described above and configured to control the operations of every other part in the peripheral circuit. The register 514 may be coupled to the control logic 512 and comprise a state register, a command register, and an address register for storing state information, command operation codes (OP codes), and command addresses for controlling the operations of each peripheral circuit. The interface 516 may be coupled to the control logic 512, and act as a control buffer to buffer and relay control commands received from a host system (not shown) to the control logic 512 and state information received from the control logic 512 to the host system. The interface 516 may be also coupled to the column decoder/bit line driver 506 via a data bus 518 and act as a data I/O interface and a data buffer to buffer and relay the data to and from the memory cell array 301.

For a NAND memory, a host system may comprise a host controller and a host memory. At least part of an entire memory bank of the host memory may comprise an HPB cache region used for a host performance booster (referred to as HPB below) function. The HPB function may refer to a function of caching at least part of mapping information of a memory device in the host memory and using at least part of the mapping information. The HPB function is described below in detail with reference to FIGS. 6, 7, and 8.

Figure 6:
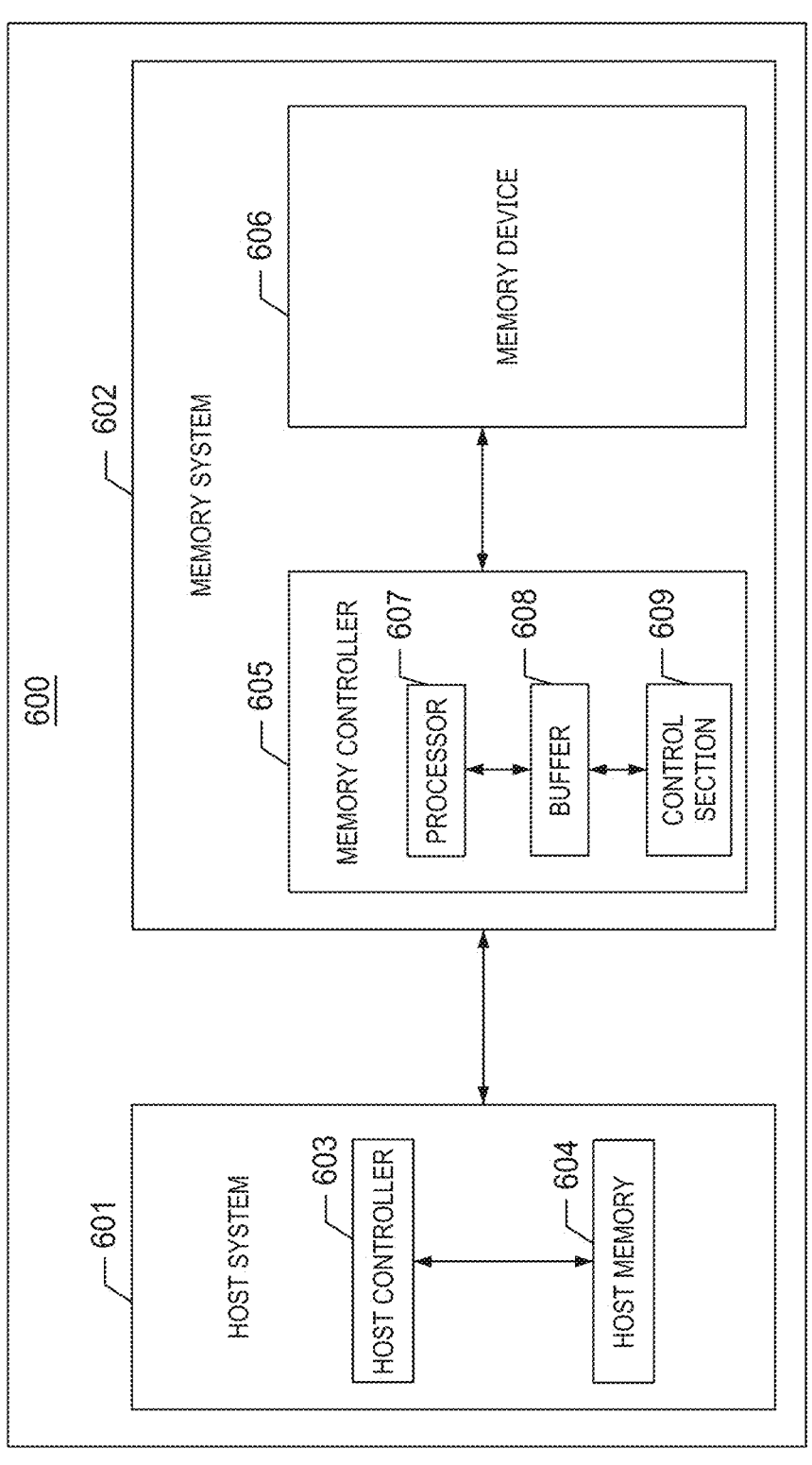
FIG. 6 is a schematic structural diagram of an electronic apparatus provided by an example of the present disclosure.

With reference to FIG. 6, FIG. 6 shows a schematic structural diagram of an electronic apparatus. As shown in FIG. 6, an electronic apparatus 600 comprises a host system 601 and a memory system 602. The memory system 602 is connected to the host system 601. The host system 601 may be an electronic apparatus, such as a personal computer, a mobile terminal, etc. The host system 601 may comprise a host controller 603 and a host memory 604 coupled with the host controller. The host controller 603 may be configured to send data to the memory system 602 or receive data from the memory system 602. The memory system 602 comprises a memory controller 605 and a memory device 606. The memory controller 605 is configured to control the memory device 606 to perform operations such as read, write, erase, etc. The memory controller 605 may also be coupled to the memory device 606 in any appropriate manner. The memory controller 605 may be configured to integrally control the memory system 602. In some examples, the memory controller 605 may comprise a processor 607, a buffer 608, and a control section 609. The processor 607 is, for example, a central processing unit (CPU), a microprocessor (MPU), etc. The memory device 606 may comprise a plurality of regions. Each region comprises a plurality of memory cells. Each memory cell is configured to store data.

In some examples, the plurality of regions of the memory device may be classified into a pinned region and a non-pinned region. Mapping information corresponding to the pinned region is cached in the host memory, to be a HPB entry (a mapping relationship between a logical address and a physical address of a memory cell in the pinned region). Based on the consideration of a storage capacity of the host memory, mapping information corresponding to the non-pinned region is stored in the memory device, that is, an L2P table of the non-pinned region. The pinned region is set during configuration of a logical unit number (LUN) of the memory device, and will not be changed. Therefore, during the configuration of the LUN, the memory system sends the HPB entry corresponding to the pinned region to the host system by using a recommendation function of the memory system. The host system stores the HPB entry in the host memory. In some examples, the pinned region is usually configured to store frequently-used data and data corresponding to a popular application. When wanting to read data corresponding to the pinned region, the host system may use the host controller to directly send a read command and an HPB entry to the memory system. The memory system uses the received HPB entry to directly read data in the pinned region, and send the read data in the pinned region to the host system.

A normal read operation and an HPB read operation are described below in detail with reference to FIGS. 7 and 8.

Figure 7:
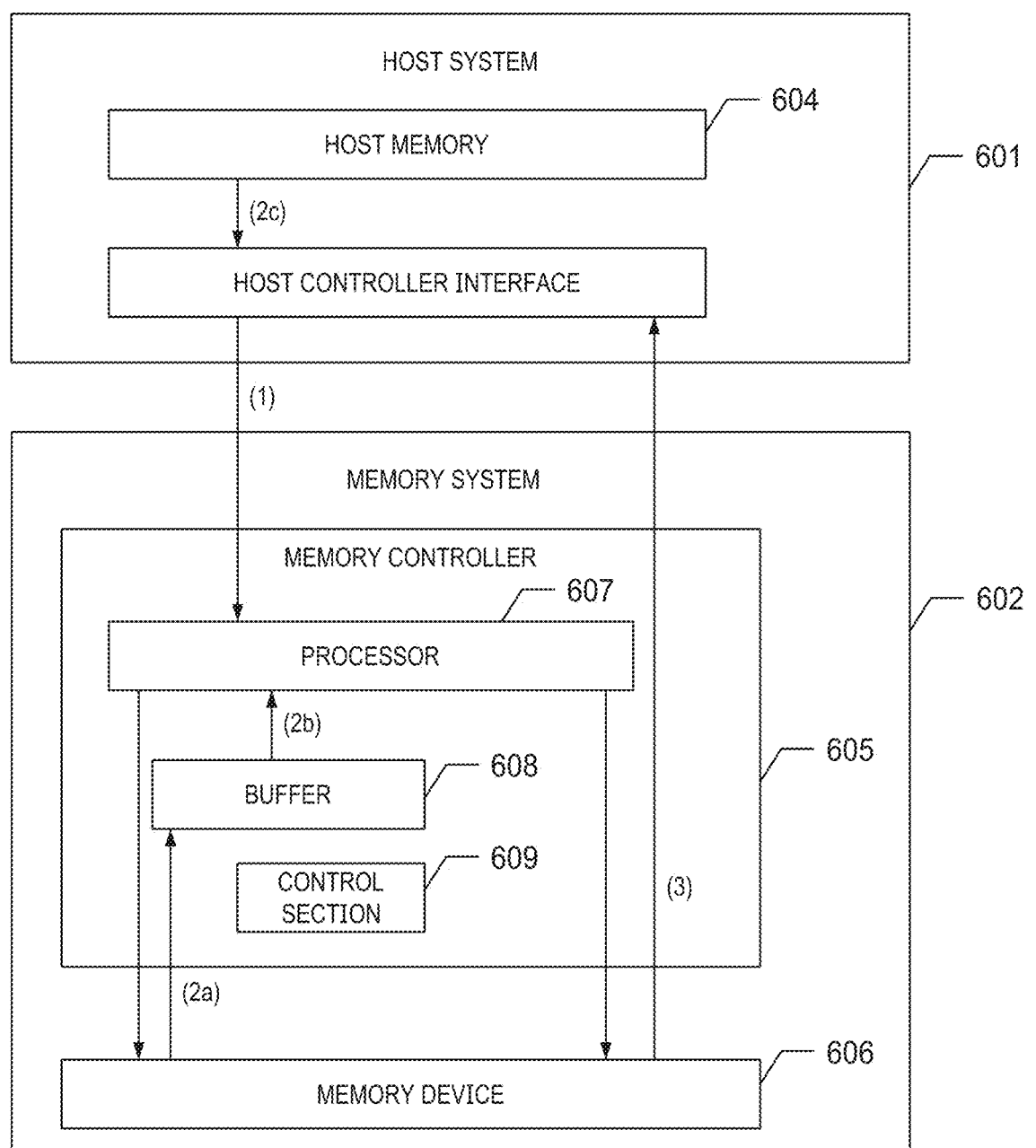
FIG. 7 is a block diagram of all interaction procedures involved in a process of performing a normal read operation and an HPB read operation between a host system and a memory system provided by an example of the present disclosure.

With reference to FIG. 7, FIG. 7 is a block diagram of all interaction procedures involved in a process of performing a normal read operation and an HPB read operation between a host system and a memory system shown by an example of the present disclosure. With reference to FIG. 7, (1) indicates the host system 601 sends a read instruction to the memory controller 605 (for example, the processor 607) of the memory system 602 through a host controller interface, to indicate to perform a read operation. The read operation may be a normal read operation or may be an HPB read operation.

In FIG. 7, (2*a*) indicates the processor 607 of the memory controller 605 searches the memory device 606 and obtains an L2P table, and stores the obtained L2P table in the buffer 608 of the memory controller. The buffer 608 may be a static random-access memory (SRAM).

The L2P table is a table of mapping relationship between logical addresses and physical addresses of the plurality of regions in the memory device. The HPB entry is a mapping relationship between a logical address and a physical address of the pinned region in the memory device.

In FIG. 7, (2*b*) indicates the buffer 608 sends the obtained L2P table to the processor 607.

In FIG. 7, (2*c*) indicates the host memory 604 is searched and an HPB entry is obtained.

In FIG. 7, (3) indicates the processor 607 obtains data in a memory cell corresponding to the L2P table from the memory device 606 according to the received L2P table based on the read instruction, and sends the obtained data to the host system 601 through the host controller interface.

With reference to FIG. 8, FIG. 8 illustrates a schematic diagram of implementation procedures corresponding to different read operations provided by an example of the present disclosure. The normal read operation may be classified into two types, for example, a first read operation 801 and a second read operation 802. The HPB read operation is a third read operation 803. tR shown in FIG. 8 is a read delay.

With reference to FIG. 8, an interaction procedure comprised in the first read operation 801 and a sequence thereof are (1), (2*a*), (2*b*), and (3). In an example, the host system 601 sends a read instruction to the processor 607 of the memory system 602; after receiving the read instruction, the processor 607 searches the memory device 606, obtains an L2P table, and stores the obtained L2P table in the buffer 608 of the memory controller; and then, the buffer 608 sends the L2P table to the processor 607. Next, the processor 607 obtains data in a memory cell corresponding to the L2P table from the memory device 606 according to the received L2P table and the read instruction, and sends the obtained data to the host system 601 through the host controller interface.

With reference to FIG. 8, an interaction procedure comprised in the second read operation 802 and a sequence thereof are (1), (2*b*), and (3). In an example, the host system

601 sends a read instruction to the processor 607 of the memory system 602; and when the buffer 608 has stored an L2P table corresponding to the read instruction, after receiving the read instruction, the processor 607 directly searches the buffer 608, obtains the L2P table, and sends the obtained L2P table to the processor 607. Next, the processor 607 obtains data in a memory cell corresponding to the L2P table from the memory device 606 according to the L2P table and the read instruction, and sends the obtained data to the host system 601 through the host controller interface.

With reference to FIG. 8, an interaction procedure comprised in the third read operation 803 and a sequence thereof are (2c), (1), and (3). In an example, the host system 601 searches the host memory 604 and obtains an HPB entry; and sends a read instruction and the HPB entry to the processor 607 of the memory system 602 through the host controller interface. After receiving the read instruction and the HPB entry, the processor 607 directly obtains data in a memory cell corresponding to the HPB entry from the memory device 606 according to the HPB entry, and sends the obtained data to the host system 601 through the host controller interface.

As can be seen from the above three operation methods, when a normal read operation is performed, after receiving a read instruction, the memory system needs to first obtain an L2P table matching the read instruction, and then obtains data corresponding to the L2P table according to the L2P table. When an HPB read operation is performed, because an HPB entry has been stored in the host memory, the host system sends a read instruction to the memory system and at the same time sends an HPB entry. In other words, after receiving a read instruction and an HPB entry, the memory system directly obtains corresponding data according to the HPB entry. That is, a procedure of a read operation can be reduced by using the HPB read operation, thereby improving the read efficiency.

However, in a process of reading data by using an HPB read operation, a region corresponding to an HPB entry is a pinned region. The pinned region is set during configuration of a LUN of the memory device, and the pinned region usually stores data corresponding to a popular application (APP). In other words, when the memory device recommends an HPB entry to the host system based on a current pinned region, the recommendation is relatively blind, inflexible, and inaccurate.

Figure 9:
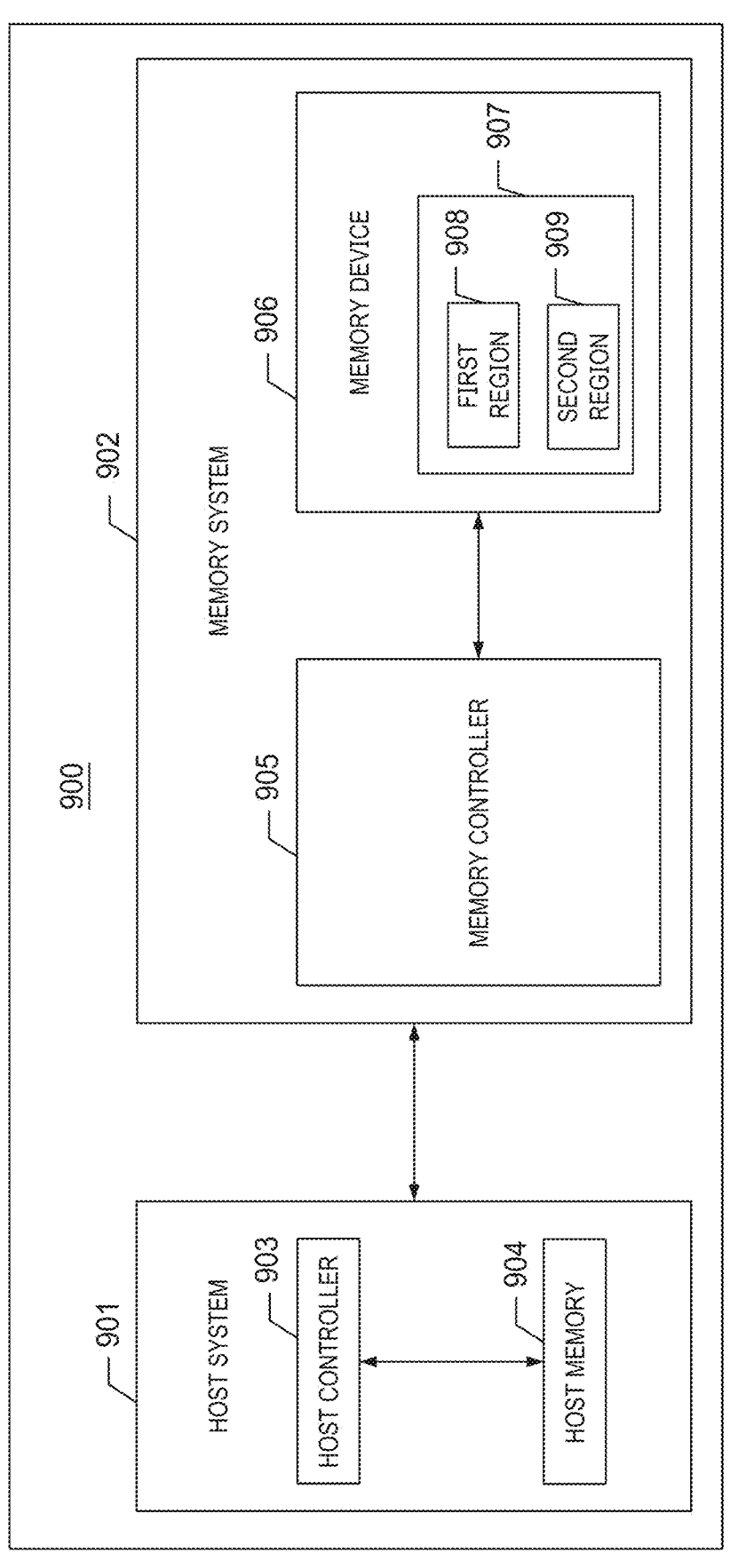
FIG. 9 is a schematic structural diagram of another electronic apparatus provided by an example of the present disclosure.

Based on this, the examples of the present disclosure further provide a host system. The host system is part of an electronic apparatus. With reference to FIG. 9, FIG. 9 is a schematic structural diagram of another electronic apparatus provided by an example of the present disclosure. An electronic apparatus 900 comprises a host system 901 and a memory system 902 coupled with the host system. The host system 901 comprises a host controller 903 and a host memory 904, and the memory system 902 comprises a memory device 906 and a memory controller 905 coupled with the memory device. The memory device 906 comprises a plurality of regions 907. The plurality of regions 907 are configured to store data corresponding to all applications. In the examples of the present disclosure, the plurality of regions 907 comprise a first region 908.

In some examples, when the host system wants to obtain mapping information and data of the first region, the host controller is configured to send a first instruction, wherein the first instruction indicates to set the first region to a pinned region and obtain mapping information corresponding to the first region.

In other words, in the host system, an instruction (for example, the first instruction) is added. The first instruction is used for indicating to also set the first region in the memory device to the pinned region. After setting the first region to the pinned region, the memory device obtains the mapping information of the first region. Here, the mapping information of the first region is an HPB entry corresponding to the first region. In addition, according to an indication of the first instruction, the mapping information of the first region is recommended to the host system, and the host system stores the mapping information of the first region in the host memory. As such, when the host system wants to obtain the data of the first region, the mapping information (that is, the HPB entry corresponding to the first region) of the first region is directly sent to the memory device. The memory device directly sends the data of the first region to the host system according to the mapping information (that is, the HPB entry corresponding to the first region) of the first region. Further, a procedure of a read operation can be reduced, thereby reducing a read time and improving read performance.

In some examples, the host controller is configured to determine the first region from the plurality of regions according to attribute information of the application. Here, the attribute information may comprise "frequently-used" and "infrequently-used". That is, the host controller may indicate a division to multiple regions, according to whether an application corresponding to data stored in the plurality of regions of the memory device is frequently-used or infrequently-used. In other words, the host controller may indicate to set a region of the plurality of regions of the memory device to the first region according to a use status of the application.

The application may be a native program or software module in an operating system, or may be a local application, that is, a program that needs to be installed in the operating system to run, for example, a WeChat APP, or may be an applet that can be embedded into any APP, that is, a program that only needs to be downloaded to a browser environment to run. In general, the above-mentioned application may be an application, a module or a plug-in in any form. It needs to be explained that the data corresponding to the application may comprise data exchanged through the application, and may further comprise data of the application itself. The data stored in the pinned region mentioned in the examples of the present disclosure is data exchanged through the application.

In some examples, the host controller is configured to: before sending the first instruction, determine that the first region is a non-pinned region. It should be understood that when the first region is set to the pinned region, the host system wants to obtain the data of the first region, it only needs to obtain the HPB entry corresponding to the first region in the host memory and send the HPB entry to the memory device, and the first instruction does not need to be sent. When the first region is a non-pinned region, the host controller can send the first instruction to the memory system, wherein the first instruction indicates to set the first region to the pinned region and obtain the mapping information of the first region.

In some examples, the host controller is further configured to send a second instruction, wherein the second instruction comprises the mapping information of the first region; and the second instruction indicates to read the data of the first region according to the mapping information of the first region.

Figure 10:
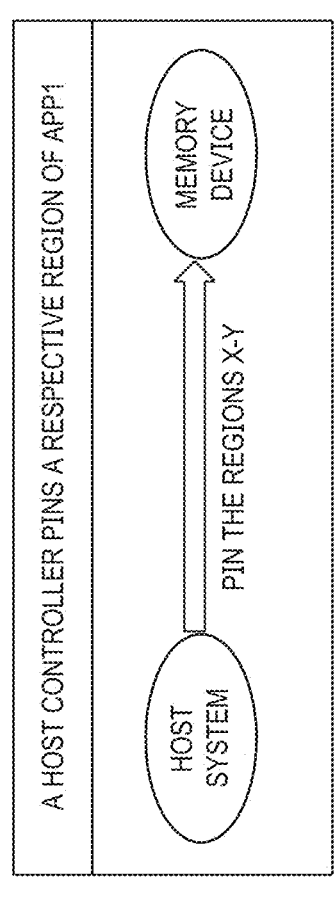
FIG. 10 is a schematic diagram of a correspondence relationship between an application and a respective region provided by an example of the present disclosure.

With reference to FIGS. 10 and 11, FIG. 10 is a schematic diagram of a correspondence relationship between an application and a respective region provided by an example of the present disclosure. FIG. 11 is a schematic flowchart of reading data of a first application provided by examples of the present disclosure. Data of a first application APP1 is stored in regions X-Y of the memory device, data of the second application APP2 is stored in regions A-B of the memory device, data of a third application APP3 before update is stored in regions C-D of the memory device, and data of the third application APP3 after the update is stored in regions E-F of the memory device.

For example, when a host system wants to obtain interaction data of the first application APP1, the host system sends an instruction to a memory system through a host controller, to indicate to set the regions X-Y corresponding to the first application APP1 to pinned regions. The memory system receives the instruction, adds the regions X-Y to a pinned region list according to the indication of the instruction, and recognizes the regions X-Y to be activated; and activates the regions X-Y, and sends information of the activated regions X-Y to the host controller. The host controller sends an instruction again, to indicate to obtain mapping information of the regions X-Y, that is, HPB entries corresponding to the regions X-Y. After receiving the instruction, the memory device reads an L2P table corresponding to all regions in the memory device, and sends the HPB entries corresponding to the regions X-Y to the host system. After receiving the HPB entries, the host system stores the HPB entries in the host memory (for example, an HPB cache).

Next, the host system sends a second instruction to the memory system, wherein the second instruction comprises the HPB entries corresponding to the regions X-Y. The memory system sends the data of the regions X-Y to the host controller according to the HPB entries corresponding to the regions X-Y.

Similarly, when wanting to obtain interaction data of the second application APP2, the host system sends a first instruction to the memory system by using the host controller, to indicate to set regions A-B corresponding to the second application APP2 to pinned regions, and obtains mapping information of the regions A-B. The host controller sends a second instruction to the memory system, wherein the second instruction comprises the mapping information of the regions A-B, and the second instruction indicates to read data of the regions A-B. The memory system receives the second instruction, reads the data of the regions A-B according to the indication of the second instruction, and sends the read data of the regions A-B to the host controller.

In some examples, with reference to FIG. 9 again, the plurality of regions 907 of the memory device further comprises a second region 909. The first region 908 and the second region 909 correspond to a same application. The first region 908 is configured to store data of the same application before update. The second region is configured to store data of the same application after update. The host controller is configured to: after sending the first instruction, if data of the same application has been updated, send a third instruction, wherein the third instruction indicates to set the first region to a non-pinned region and set the second region to a pinned region.

For example, with reference to FIG. 10, when wanting to obtain interaction data of the third application APP3, the host system sends the first instruction to the memory system by using the host controller. However, the interaction data of the third application APP3 has been updated, wherein regions C-D are configured to store data of the third application APP3 before the update, and regions E-F are configured to store data of the third application APP3 after the update. In this case, the host controller sends a third instruction, wherein the third instruction indicates to set the regions C-D to non-pinned regions and set the regions E-F to pinned regions. Next, after the regions C-D are set to non-pinned regions and the regions E-F are set to the pinned regions, according to the indication of the first instruction, the memory system sends mapping information of the regions E-F to the host controller. The host controller sends a second instruction to the memory system, wherein the second instruction comprises the mapping information of the regions E-F. The memory system reads data of the regions E-F according to the mapping information of the regions E-F and the indication of the second instruction, and sends the read data of the regions E-F to the host controller.

As such, when subjectively wanting to obtain mapping information of an application corresponding to a first region, a host system may send a first instruction to a memory device, set the first region to a pinned region, and obtain the mapping information of the application corresponding to the first region. In contrast, compared with that the memory device blindly recommends mapping information of applications corresponding to the plurality of regions to a host controller when the host system subjectively wants to obtain the mapping information of the application corresponding to the first region, in the examples of the present disclosure, the mapping information of the first region can be obtained more accurately and more time-efficiently, thereby improving read accuracy, reducing a read time, and further improving the read performance of the host system and the memory device.

In some examples, the host controller is configured to: before sending the first instruction, send a fourth instruction, wherein the fourth instruction indicates to write data to the memory device.

In other words, before the first region is pinned, it needs to be first ensured that data has been written in the first region before the data in the first region can be pinned and the mapping information of the first region can be obtained. Based on this, the host controller is further configured to send a fourth instruction to the memory system, to indicate the memory system to write data of the application corresponding to the first region to the first region.

Based on the above host system, examples of the present disclosure provide a memory system, which is coupled with a host system, and comprises: a memory device, comprising a plurality of regions, wherein the plurality of regions comprise a first region; and a memory controller, coupled with the memory device, and configured to: receive a first instruction; and in response to the first instruction, set the first region to a pinned region, and determine mapping information corresponding to the first region, wherein the first region is determined according to an application corresponding to a respective region.

In some examples, the memory controller is configured to: receive a second instruction, wherein the second instruction comprises the mapping information; and in response to the second instruction, read data of the first region according to the mapping information.

In some examples, the plurality of regions further comprise a second region, and the first region and the second region correspond to a same application; the first region is configured to store data of the same application before update; the second region is configured to store data of the same application after update; and the memory controller is configured to: after receiving the first instruction, if data of the same application has been updated, receive a third instruction; and in response to the third instruction, set the first region to a non-pinned region, and set the second region to a pinned region.

In some examples, the memory controller is configured to: before receiving the first instruction, receive the fourth instruction; and in response to the fourth instruction, write data to the memory device.

Based on the above host system and memory system, examples of the present disclosure provide an electronic apparatus and an operation method thereof. With reference to FIG. 12, FIG. 12 is a schematic flowchart of an operation method of an electronic apparatus provided by an example of the present disclosure. The operation method comprises the following operations. Operation S1201: A host system of the electronic apparatus sends a first instruction. Operation S1202: A memory controller of the electronic apparatus receives the first instruction; and in response to the first instruction, sets a first region to a pinned region, and determines mapping information corresponding to the first region.

An interaction procedure of the electronic apparatus is described below in detail with reference to FIGS. 12 and 13.

Figure 13:
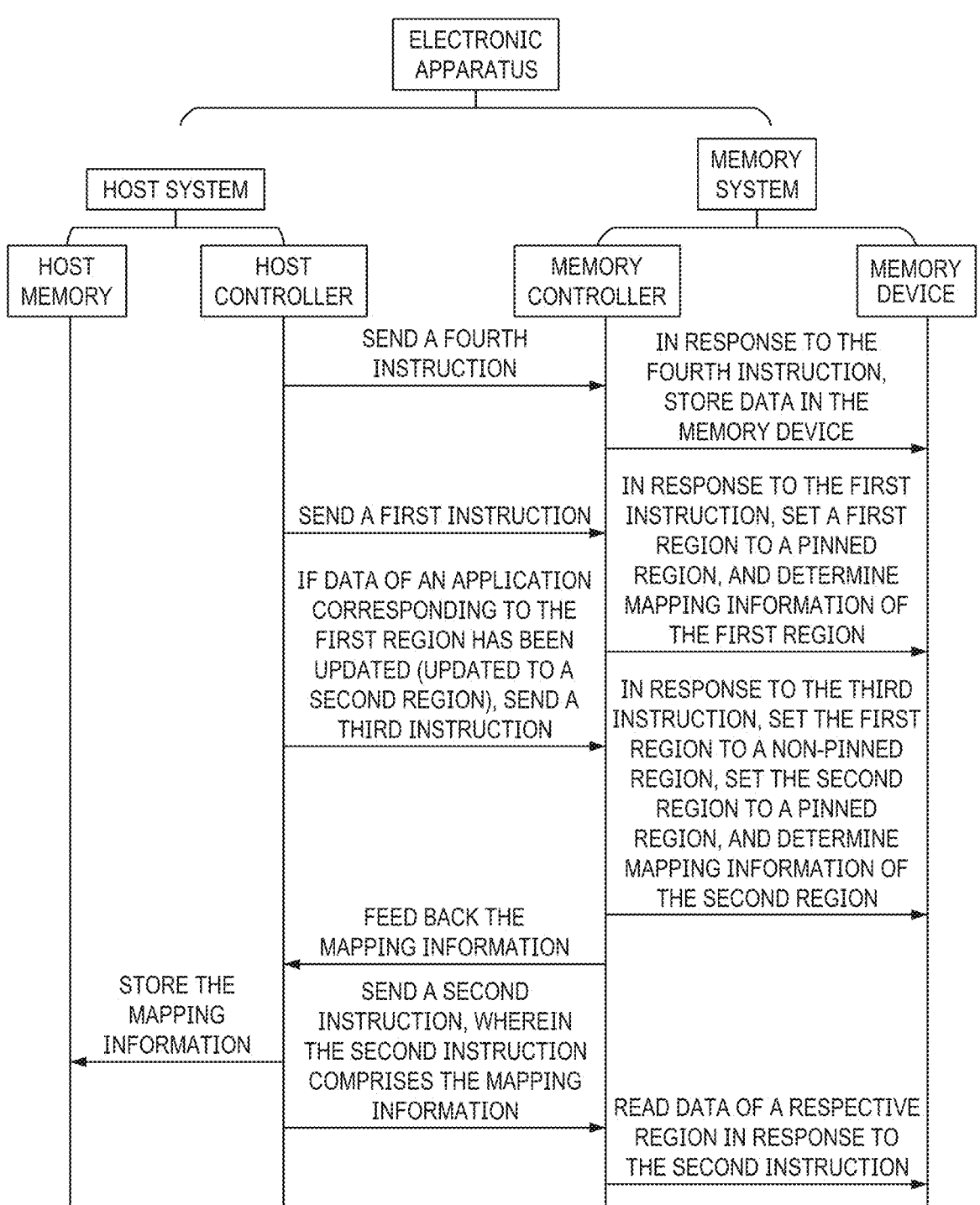
FIG. 13 is a schematic diagram of an interaction procedure of an electronic apparatus provided by an example of the present disclosure.

With reference to FIG. 13, the electronic apparatus comprises a host system and a memory system, wherein the memory system comprises a memory device and a memory controller; the memory device comprises a plurality of regions; and the plurality of regions comprise a first region.

In some examples, the operation method further comprises: before the host system sends the first instruction, sending a fourth instruction; and before the memory controller receives the first instruction, receiving the fourth instruction; and in response to the fourth instruction, writing data to the memory device.

In some examples, the operation method further comprises: after the first instruction is sent and before the second instruction is sent, if data of an application corresponding to the first region has been updated, sending, by the host system, a third instruction; and receiving, by the memory controller, the third instruction; and in response to the third instruction, setting the first region to a non-pinned region, and setting a second region to a pinned region, wherein the plurality of regions further comprise the second region, and the first region and the second region correspond to a same application; the first region is configured to store data of the same application before update; and the second region is configured to store data of the same application after update.

After the first region is set to a non-pinned region and the second region is set to a pinned region, mapping information of the pinned region determined by the memory controller is mapping information of the second region. Based on this, mapping information sent by the memory controller to a host controller is the mapping information of the second region. That is, mapping information stored in the host memory is also the mapping information of the second region.

In some examples, the host system sends a second instruction, wherein the second instruction comprises the mapping information; and the memory controller receives the second instruction; and in response to the second instruction, reads data of the first region according to the mapping information.

If the data of the application corresponding to the first region has not been updated, data that the second instruction indicates to read is the data of the first region. At this time, the memory controller reads the data of the first region in response to the second instruction. If the data of the application corresponding to the first region has been updated, the data that the second instruction indicates to read is data of the second region. At this time, the memory controller reads the data of the second region in response to the second instruction.

Examples of the present disclosure provide an electronic apparatus, comprising: a host system and a memory system coupled with the host system, wherein the memory system comprises a memory device and a memory controller coupled with the memory device; the memory device comprises a plurality of regions; and the plurality of regions comprise a first region; the host system is configured to send a first instruction; and the memory controller is configured to: receive the first instruction; and in response to the first instruction, set the first region to a pinned region, and determine mapping information corresponding to the first region, wherein the first region is determined according to an application corresponding to a respective region.

In some examples, the host system is configured to send a second instruction, wherein the second instruction comprises the mapping information; and the memory controller is configured to: receive the second instruction; and in response to the second instruction, read data of the first region according to the mapping information.

In some examples, the host system is configured to: after sending the first instruction, if data of an application corresponding to the first region has been updated, send a third instruction; and the memory controller is configured to: after receiving the first instruction, if the data of the application corresponding to the first region has been updated, receive the third instruction; and in response to the third instruction, set the first region to a non-pinned region, and set a second region to a pinned region, wherein the plurality of regions further comprise the second region, and the first region and the second region correspond to a same application; the first region is configured to store data of the same application before update; and the second region is configured to store data of the same application after update.

In some examples, the host system is configured to: before sending the first instruction, send a fourth instruction; and the memory controller is configured to: before receiving the first instruction, receive the fourth instruction; and in response to the fourth instruction, write data to the memory device.

In some examples, the memory system comprises a universal flash storage (UFS) device or a solid-state drive (SSD). The memory device comprises a NAND memory.

Examples of the present disclosure further provide a storage medium which stores executable instructions.

In some examples, the storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a CD-ROM (Compact Disc Read-Only Memory) and other memories, or various apparatuses comprising any one or any combination of the above memory devices.

In some examples, executable instructions may be written in any form of programming language (comprising a compiled or interpreted language, or a declarative or procedural language) by adopting a form of a program, a software, a software module, a script or a code; and it may be deployed in any form, comprising deployed as an independent program or as a module, a component, a subroutine, or other units suitable for use in a computing environment.

As an example, the executable instruction may, but do not necessarily, correspond to files in a file system, may be stored in part of a file storing other programs or data, for example, stored in one or more scripts in a Hyper Text Markup Language (HTML) document, stored in single file dedicated for the discussed program, or stored in a plurality of cooperative files (e.g., the file for storing one or more modules, subprograms or code portions).

As an example, the executable instruction may be deployed on an electronic apparatus for execution, or on a plurality of electronic apparatuses at one site for execution, or distributed on a plurality of electronic apparatuses interconnected through a communication network and at a plurality of sites for execution.

It should be understood that, references to "one example" or "an example" throughout this specification mean that particular features, structures, or characteristics related to the example are comprised in at least one example of the present disclosure. Therefore, "in one example" or "in an example" presented throughout this specification does not necessarily refer to the same example. Furthermore, these particular features, structures, or characteristics may be incorporated in one or more examples in any suitable manner. In various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

The methods disclosed in several method examples as provided by the present disclosure may be combined freely to obtain new method examples in case of no conflicts. The above descriptions are merely example implementations of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims

What is claimed is:

1. A host system, comprising:
a host controller coupled to a memory system, wherein the memory system comprises a memory controller and a memory device, the memory device comprises a plurality of regions, and the plurality of regions comprises a first region and a second region, the first region and the second region correspond to a same application, the first region is configured to store data of the same application before update, and the second region is configured to store data of the same application after update, wherein the host controller is configured to:
send a first instruction to the memory controller instructing the memory controller to set the first region to a pinned region and obtain mapping information corresponding to the first region, wherein the first region is determined according to an application corresponding to a respective region; and
after sending the first instruction, if data of the same application has been updated, send a third instruction, wherein the third instruction indicates to set the first region to a non-pinned region and set the second region to the pinned region.

2. The host system of claim 1, wherein the host controller is configured to:
send a second instruction comprising the mapping information and indicating to read data of the first region according to the mapping information.

3. The host system of claim 1, wherein the host controller is configured to:
determine the first region from the plurality of regions according to attribute information of the application.

4. The host system of claim 1, wherein the host controller is configured to:
before sending the first instruction, determine that the first region is a non-pinned region.

5. The host system of claim 1, wherein the host controller is configured to:
before sending the first instruction, send a fourth instruction, wherein the fourth instruction indicates to write data to the memory device.

6. The host system of claim 1, wherein the host system further comprises: a host memory configured to store the mapping information.

7. A memory system, coupled to a host system that comprises a host controller, the memory system comprising:
a memory device, comprising a plurality of regions, wherein the plurality of regions comprises a first region and a second region, the first region and the second region correspond to a same application, the first region is configured to store data of the same application before update, and the second region is configured to store data of the same application after update; and
a memory controller, coupled to the memory device, and configured to:
receive a first instruction from the host controller;
in response to the first instruction, set the first region to a pinned region;
determine mapping information corresponding to the first region, wherein the first region is determined according to an application corresponding to a respective region;
after receiving the first instruction, if data of the same application has been updated, receive a third instruction; and
in response to the third instruction, set the first region to a non-pinned region, and set the second region to the pinned region.

8. The memory system of claim 7, wherein the memory controller is configured to:
receive a second instruction comprising the mapping information; and
in response to the second instruction, read data of the first region according to the mapping information.

9. The memory system of claim 7, wherein the memory controller is configured to:
before receiving the first instruction, receive a fourth instruction; and
in response to the fourth instruction, write data to the memory device.

10. The memory system of claim 7, wherein the memory system comprises a solid state disk (SSD).

11. The memory system of claim 7, wherein the memory device comprises three-dimensional NAND memory.

12. An electronic apparatus, comprising:
a host system comprising a host controller; and
a memory system, coupled to the host system and comprising:
a memory device; and
a memory controller coupled to the memory device, wherein the memory device comprises a plurality of regions, the plurality of regions comprises a first region and a second region, the first region and the second region correspond to a same application, the first region is configured to store data of the same application before update, and the second region is configured to store data of the same application after update;

the host system is configured to:

send, via the host controller, a first instruction; and after sending the first instruction, in response to data of an application corresponding to the first region being updated, send a third instruction; and the memory controller is configured to:

receive the first instruction from the host controller;

in response to the first instruction, set the first region to a pinned region;

determine mapping information corresponding to the first region, wherein the first region is determined according to an application corresponding to a respective region;

send, to the host system, the mapping information corresponding to the first region to be stored in a host memory of the host system;

receive the third instruction; and in response to the third instruction, set the first region to a non-pinned region, and set a second region to the pinned region.

13. The electronic apparatus of claim 12, wherein the host system is configured to send a second instruction comprising the mapping information; and the memory controller is configured to:

receive the second instruction; and in response to the second instruction, read data of the first region according to the mapping information.

14. The electronic apparatus of claim 12, wherein the host system is configured to:

before sending the first instruction, send a fourth instruction; and the memory controller is configured to:

before receiving the first instruction, receive the fourth instruction; and in response to the fourth instruction, write data to the memory device.

15. The electronic apparatus of claim 12, wherein the host system is configured to:

determine the first region from the plurality of regions according to attribute information of the application.

16. The electronic apparatus of claim 12, wherein the host system is configured to:

before sending the first instruction, determine that the first region is a non-pinned region.

17. The host system of claim 1, wherein the host controller is configured to:

determine that the first region is the non-pinned region; and responsive to determining that the first region is the non-pinned region and mapping information of the first region is to be obtained, send the first instruction.

18. The host system of claim 7, wherein the host system further comprises: a host memory configured to store the mapping information.

19. The electronic apparatus of claim 14, wherein the fourth instruction indicates to write data to the memory device.

20. The electronic apparatus of claim 12, wherein the host controller is configured to:

determine that the first region is the non-pinned region; and responsive to determining that the first region is the non-pinned region and mapping information of the first region is to be obtained, send the first instruction.

\* \* \* \* \*